M. B. MASON.
Desulphurizing and Oxidizing Metallic Ores.
No. 45,803.  Patented Jan. 3, 1865.
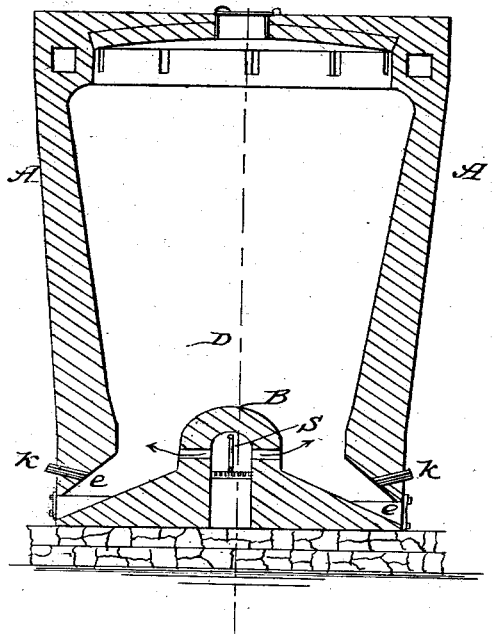
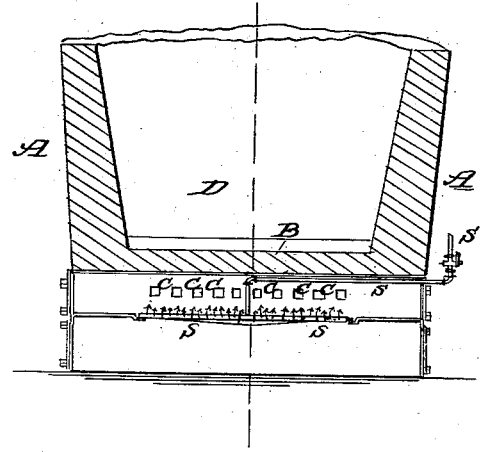

UNITED STATES PATENT OFFICE.

MELCHOR B. MASON, OF NEW YORK, N. Y., ASSIGNOR TO C. V. DE FOREST, AMOS HOWES, AND GEO. E. VANDERBURGH, OF SAME PLACE.

IMPROVED METHOD OF DESULPHURIZING AND OXIDIZING METALLIC ORES.

Specification forming part of Letters Patent No. 45,803, dated January 3, 1865.

*To all whom it may concern:*

Be it known that I, MELCHOR B. MASON, of New York city, in the county and State of New York, have invented a new and Improved Method of Desulphurizing and Oxidizing Metallic Ores; and I do hereby declare that the following is a full, clear, and exact description thereof, reference being had to the accompanying drawings, forming a part of this specification, in which—

Figure 1 is a central vertical section of a furnace suitable for carrying out my process, and Fig. 2 is a central vertical section of the same at right angles to that shown in Fig. 1.

Similar letters indicate like parts in each of the figures.

My invention consists of an improved process for treating auriferous, argentiferous, and other metallic ores with hydrogen and carbonic-acid gases in such a manner as to eliminate and separate therefrom any sulphur, arsenic, phosphorus, or antimony, and oxidize all the baser metal contained therein by passing said gases in an inflamed state through and among a mass of the ore exposed to their action in a cold and raw condition, and which may be treated either in lumps or in a pulverized state.

In carrying my process into practical effect I may employ any furnace having a suitable reducing-chamber to contain the ore, (either pulverized or in lumps,) connected with a chamber in which to generate the gases; but I prefer to use, for the treatment of ores in the lump, a furnace constructed and arranged substantially as illustrated in the drawings. This furnace A A is built up in an upwardly-flaring form, so as to be considerably larger in area at the top than at the bottom, and is constructed over a gas-generating and combustion-chamber, B. A series of small flues or openings, $c\,c$, are formed in the walls of the chamber B, through which the gases generated therein pass freely into the bottom of the reducing-chamber D. The discharge-openings $e\,e$, through which the reduced ore is withdrawn from said chamber D, are placed on either side and below the gas-generating chamber B, as indicated in Fig. 1.

Within the gas-generating and combustion-chamber B is placed a pipe, S, connected with a steam-boiler, and so arranged (as indicated in Fig. 2 of the drawings) as that the steam passing through it shall be superheated and in that state escape into the fire in fine jets. The carbonaceous matter evolved by the combustion of the fuel in the chamber B, having an affinity for the oxygen of the steam, will combine therewith to form a carbonic oxide, liberating freely at the same time hydrogen gas, while the current of atmospheric air which feeds the fire and supports combustion will afford sufficient free oxygen to convert the carbonic oxide into carbonic-acid gas. Although I prefer to use superheated steam in generating the gases named, still I contemplate the use of aqueous vapor in any form for the purpose. The inflamed hydrogen and carbonic-acid gases thus generated in the chamber B flow thence through the openings $c\,c$ into the bottom of the reducing-chamber D, and, passing upward therein, will permeate and heat the entire mass of ore contained in the furnace. As the gases which eliminate and separate the sulphur, arsenic, &c., from the ores thus serve in this my improved process to heat the same also, the first and second atoms of the sulphurets therein, which are disengaged, respectively, at different degrees of temperature, are each, so soon as disengaged, at once taken up by the hydrogen, forming sulphureted hydrogen, arsenicated hydrogen, phosphoreted hydrogen, &c., as the case may be, and thus carried away. In the meantime the carbonic-acid gas, together with the oxygen of the air, acting upon the baser metals, oxidizes them.

This process of desulphurizing and oxidizing auriferous and argentiferous ores, I believe, simultaneously converts the negative into positive or metallic gold or silver, a condition in which, as I further believe, these metals do not originally exist in the ore.

To prevent excessive heat in the furnace and avoid the fusion of the sulphurets, steam is admitted into the reducing-chamber D on each side of the gas-generating chamber B, through suitable pipes, K K, in such a manner as to control and regulate the temperature.

As it is necessary in my process to avoid as far as possible the presence of carbonic oxide in the ore-chamber of my furnace, and to secure as perfectly as possible currents of pure hydrogen and carbonic-acid gases, I prefer to generate the same in an open fire-box or combustion-chamber, as described. I do not, however, limit myself to or claim any specific manner of forming or generating said gases; nor do I claim, broadly, the direct application of steam in the calcination or roasting of argentiferous or other metallic ores for the purpose of expelling the sulphur therefrom, when said ores are previously heated in a furnace or retort, as described in the English patents granted to Julian E. D. Rodgers in January, 1843, and to Andrew G. Hunter in 1860, for I rely solely and entirely upon the inflamed gases alone for heating the ores. I disclaim also the use of air or steam, or a mixture of air and steam, for the separation of sulphur from metallic sulphurets, when air, steam, or a mixture of air and steam, is forced through and among fused ores or sulphurets, as described in said English patent of Andrew G. Hunter, for I deem it essential to the success of my process that a fusion, or even excessive heat of the ores and sulphurets, be avoided; and, finally, I disclaim the use of carbonic oxide for the purpose of treating the ores as described; but Having fully described my invention, what I claim therein as new, and desire to secure by Letters Patent, is—

1. My improved process for removing sulphur, arsenic, phosphorus, and antimony from auriferous, argentiferous, or other metallic ores, and for oxidizing the said ores by treating them with hydrogen and carbonic-acid gases, substantially in the manner herein set forth.

2. As a part of my improved process, the admission of steam into the chamber wherein the metallic ores are heated, desulphurized, and oxidized, substantially in the manner and for the purpose herein set forth.

MELCHOR B. MASON.

In presence of—
THOMAS ADAMS,
RANDOLPH COYLE, Jr.